(12) United States Patent  (10) Patent No.: US 7,177,587 B2
Sugata  (45) Date of Patent: Feb. 13, 2007

(54) SWITCHBACK DEVICE AND IMAGE FORMING APPARATUS INCLUDING IT (75) Inventor: Yoshihisa Sugata, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 0 days.

(21) Appl. No.: 10/937,742

(22) Filed: Sep. 10, 2004

(65) Prior Publication Data
US 2005/0063746 A1 Mar. 24, 2005

(30) Foreign Application Priority Data
Sep. 10, 2003 (JP) ............................. 2003-318097
Aug. 17, 2004 (JP) ............................. 2004-237032

(51) Int. Cl.
G03G 15/00 (2006.01)
(52) U.S. Cl. ...................................... 399/401; 399/381
(58) Field of Classification Search ................ 399/401, 399/402, 406, 381
See application file for complete search history.

(56) References Cited
U.S. PATENT DOCUMENTS
6,895,212 B2 *  5/2005  Yamakawa et al. ......... 399/407
2003/0044208 A1 *  3/2003  Kouno ....................... 399/406
2003/0199377 A1 * 10/2003  Driggers .................... 493/434

FOREIGN PATENT DOCUMENTS
JP  2001-142190 A  5/2001

* cited by examiner

Primary Examiner—Anthony H. Nguyen
(74) Attorney, Agent, or Firm—Smith Patent Office (57) ABSTRACT To suppress generation of scratches and dirt on a printed face and to intend to reduce in size, a switchback device (1) provided in a conveyance path (12) for a printed medium (3), for reversing the direction of movement of the medium (3) sent from an upstream part (4) of the conveyance path (12) and then delivering the medium (3) to a downstream part (5) of the conveyance path (12), comprises a pair of operation rollers (15) including a drive roller (13) for conveying the medium (3) and a slave roller (14) cooperating with the drive roller (13) to pinch the medium (3); and a changeover mechanism (16) for changing a direction of the pair of operation rollers (15) including the drive roller (13) and the slave roller (14). The medium (3) sent from the upstream part (4) of the conveyance path (12) which is pinched by the pair of operation rollers (15) is, in this state, changed in direction as a result of a change of the direction of the pair of operation rollers (15) by the changeover mechanism (16), and then is delivered to the downstream part (5) of the conveyance path (12) by reversing rotation of the drive roller (13). Thus, generation of scratches and dirt on the printed face (3a) of the medium (3) can be suppressed and the space for taking the medium (3) in upon switchback can be reduced in size.

17 Claims, 8 Drawing Sheets

PRIOR ART

FIG. 8

PRIOR ART

SWITCHBACK DEVICE AND IMAGE FORMING APPARATUS INCLUDING IT

BACKGROUND OF THE INVENTION

1. Field of the Invention

The present invention relates to a switchback device, provided in a conveyance path for a printed medium, for reversing the direction of movement of the medium and then delivering the medium from an upstream part to a downstream part of the conveyance path.

2. Description of the Related Art

In an inkjet printer, a photo printing/developing machine, or the like, a printed medium such as a printed paper is discharged from the machine preferably in a state wherein the printed face of the medium faces upward, in order that the user can easily check the printed condition. For this purpose, some such machines are provided with switchback devices in their media conveyance paths.

Figure 7:
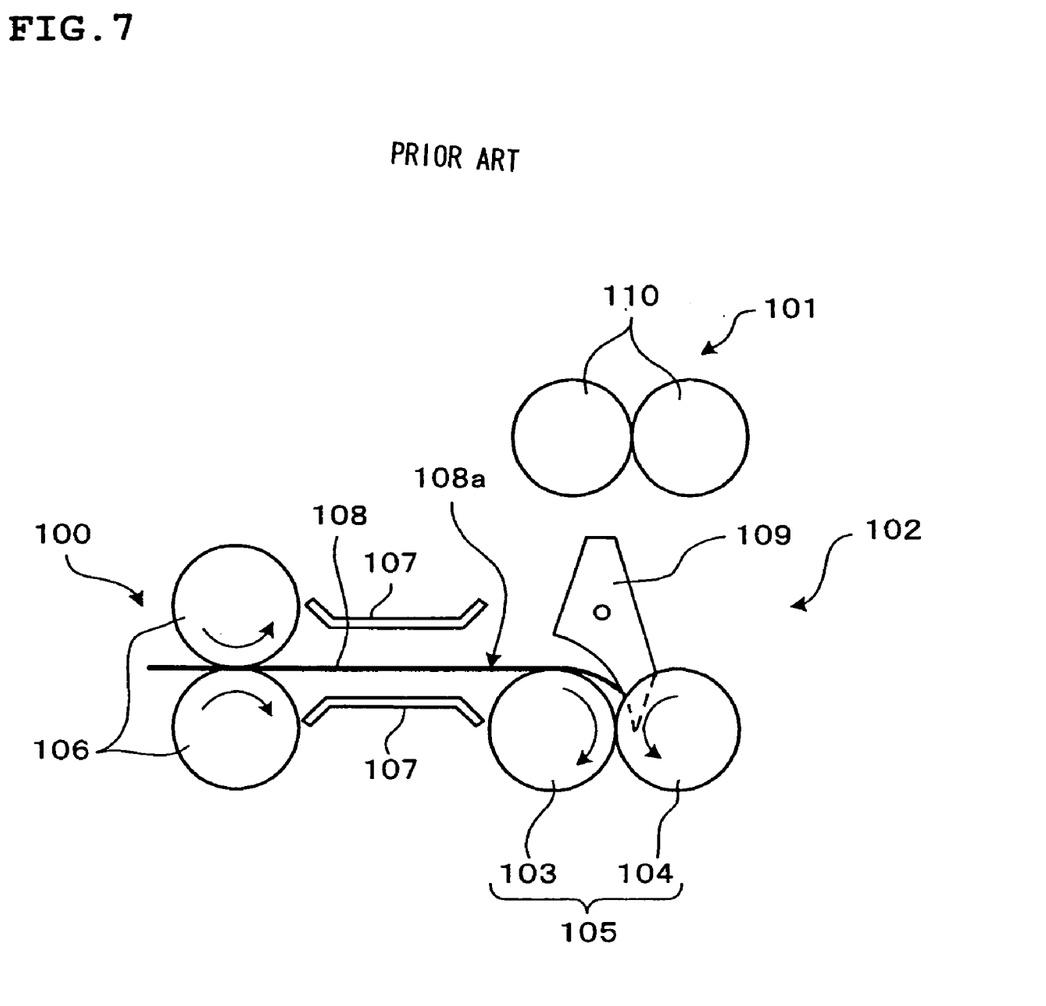
FIG. 7 is a side view of a prior art switchback device in a state wherein a medium is being taken in the device.
Figure 8:
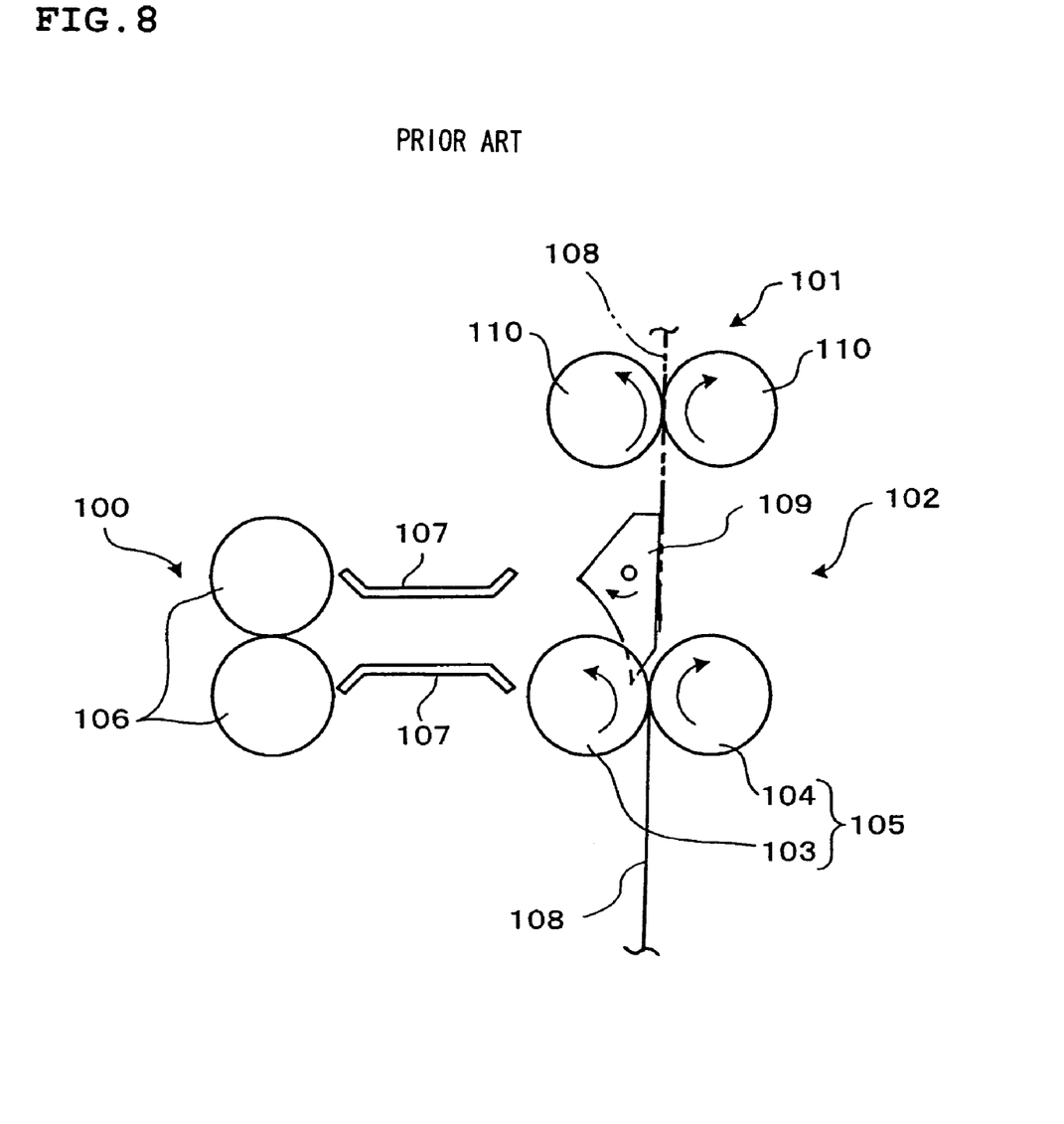
FIG. 8 is a side view of the prior art switchback device in a state wherein the medium is being sent out from the device.

JP-A-2001-142190 discloses a photo printing/developing machine including a switchback device. As shown in FIGS. 7 and 8, the switchback device 102 is provided between an upstream part 100 of a conveyance path and a downstream part 101 of the conveyance path. The switchback device 102 includes a pair of operation rollers 105 including a drive roller 103 and a slave roller 104; plate-like fixed guides 107 for guiding a medium 108 along both faces of the medium 108 from a pair of rollers 106 in the upstream part 100 of the conveyance path to the pair of operation rollers 105; and a rotatable switchback guide 109 for changing the direction of the medium 108 being pinched by the pair of operation rollers 105, and then guiding the medium 108 to the downstream part 101 of the conveyance path. The switchback guide 109 does not rotate relative to the medium 108.

FIG. 7 is a side view showing a state wherein the medium 108 is being taken in the switchback device 102. The medium 108 being conveyed from the pair of rollers 106 in the upstream part 100 of the conveyance path is guided to the pair of operation rollers 105 by the fixed guides 107. The medium 108 comes into contact with the switchback guide 109 and the direction of the movement of the medium 108 is changed downward at a nearly right angle by the switchback guide 109. The medium 108 is then pinched by the pair of operation rollers 105. In this process, the leading edge and the printed face 108a of the medium 108 come into contact with the switchback guide 109 and they are rubbed by the switchback guide 109.

FIG. 8 is a side view showing a state wherein the medium 108 has been completely taken in the switchback device 102. When the rear end portion of the medium 108 is pinched by the pair of operation rollers 105, the switchback guide 109 rotates by its own weight in the direction indicated by an arrow in FIG. 8. The pair of operation rollers 105 is then reversed in rotation. Because the switchback guide 109 has rotated, the medium 108 is guided by the switchback guide 109 to a pair of rollers 110 in the downstream part 101 of the conveyance path, as shown by an alternate long and two short dashes line in FIG. 8. Thus, the medium 108 is, after switchback, guided to the downstream part 101 of the conveyance path.

JP-A-2001-142190 further discloses another switchback device in which the slave roller 104 is disposed at a position somewhat lower than the drive roller 103 and the switched guide 109 is fixed.

In JP-A-2001-142190, the printed face 108a of the medium 108 comes into contact with the switchback guide 109, which does not rotate relative to the medium 108. In this state, the medium 108 is forcibly bent and guided by the switchback guide 109. This may cause scratches and dirt on the printed face 108a. In addition, because one fixed guide 107 is provided between the pair of rollers 106 in the upstream part 100 of the conveyance path and the pair of operation rollers 105 so as to face the printed face 108a of the medium 108, the fixed guide 107 may cause scratches and dirt on the printed face 108a if the medium 108 is curved.

Further, the drive roller 103 can not be reversed until the rear end portion of the medium 108 is pinched by the pair of operation rollers 105. Thus, a large space is required so that the whole medium 108 can be taken in for switchback. This makes it difficult to reduce the size of the device.

SUMMARY OF THE INVENTION

An object of the present invention is to provide a switchback device that can suppress generation of scratches and dirt on the printed face of a medium and can realize a reduction in size of the device.

According to an aspect of the present invention, a switchback device provided in a conveyance path for a printed medium, for reversing the direction of movement of the medium sent from an upstream part of the conveyance path and then delivering the medium to a downstream part of the conveyance path, comprises a pair of rollers including a drive roller that conveys the medium and a slave roller that cooperates with the drive roller to pinch the medium; and a changeover mechanism that changes a direction of the pair of rollers including the drive roller and the slave roller. The medium sent from the upstream part of the conveyance path which is pinched by the pair of rollers is, in this state, changed in direction as a result of a change of the direction of the pair of rollers by the changeover mechanism, and then is delivered to the downstream part of the conveyance path by reversing rotation of the drive roller.

According to this aspect, switchback of the medium can be realized without using a switchback guide that does not rotate relative to the medium, as in the prior art. Therefore, generation of scratches and dirt on the printed face of the medium can be suppressed. Further, because a change of direction of the medium can be performed even in a state wherein the entire medium has not been taken in by the pair of rollers, the space for taking the medium in upon switchback can be reduced in size.

According to another aspect of the present invention, the drive roller is fixed in a predetermined position, the slave roller revolves around the drive roller, and the changeover mechanism revolves the slave roller to change the direction of the pair of rollers. According to this aspect, the direction of the pair of rollers can be changed by moving only the slave roller.

According to still another aspect of the present invention, the switchback device preferably further comprises a guide member that is disposed in the vicinity of the pair of rollers and guides the medium, the guide member being able to change the direction in which the medium is guided, in accordance with the change of direction of the pair of rollers. According to this aspect, because the medium is always guided by the guide member in the vicinity of the pair of rollers, the medium can surely be conveyed.

According to still another aspect of the present invention, it is preferable that the guide member does not rotate relative to the medium and is provided only on the back side of the medium. According to this aspect, because no guide member that does not rotate relatively to the medium is provided on the printed face side of the medium, the printed face of the medium is prevented from coming into contact with such a guide member and thereby generation of scratches and dirt on the printed face can be suppressed.

According to still another aspect of the present invention, the guide member is preferably a freely rotatable guide roller. According to this aspect, because the guide member rotates while it is in contact with the printed face, the medium can be guided by the guide member with suppressing generation of scratches and dirt on the printed face.

According to still another aspect of the present invention, the switchback device preferably further comprises a contact member that is provided on the back side of the medium sent from the upstream part of the conveyance path and being pinched by the drive roller and the slave roller, the contact member coming into contact with a back face of the medium when the changeover mechanism changes the direction of the pair of rollers.

According to this aspect, when the changeover mechanism changes the direction of the pair of rollers including the drive roller and the slave roller, the back face of the medium that has passed between the drive roller and the slave roller and is being pinched by them comes into contact with the contact member. At this time, the medium is curved by either of the drive roller and the slave roller which is in contact with the record face of the medium. When the medium is conveyed in that state toward the downstream part of the conveyance path and passes between the drive roller and the slave roller, the medium is curved in reverse to curl. Thus, curl of the medium is relieved.

According to still another aspect of the present invention, the contact member is preferably a freely rotatable roller. According to this aspect, because the contact member rotates while it is in contact with the back face of the medium, generation of scratches and dirt on the back face of the medium can be suppressed.

According to still another aspect of the present invention, it is preferable that, after the changeover mechanism changes the direction of the pair of rollers, the medium having passed between the drive roller and the slave roller is pinched by the contact member and either of the drive roller and the slave roller which is located on the record face side of the medium relative to the common tangent of the drive roller and the slave roller.

According to this aspect, the medium having passed between the drive roller and the slave roller is conveyed toward the downstream part of the conveyance path while the medium is pressed onto the roller locating on the record face side of the medium relative to the common tangent of the drive roller and the slave roller. Therefore, because the medium having passed between the drive roller and the slave roller is surely conveyed in a state wherein the medium is curved in reverse to curl. Thus, the curl of the medium conveyed to the downstream part of the conveyance path is relieved at a high probability.

According to still another aspect of the present invention, the switchback device preferably further comprises a pressing member that, after the changeover mechanism changes the direction of the pair of rollers, presses the medium onto the contact member while being in contact with a record face of the medium having passed between the drive roller and the slave roller. According to this aspect, because the pressing member presses the medium onto the contact member, a case can be prevented wherein an edge of the curved medium rebounds and collides with another member and as a result, the medium is bent or scratched and dirt is generated on the record face of the medium.

According to still another aspect of the present invention, an image forming apparatus comprises the switchback device according to any of the above-described aspects. According to this aspect, because generation of scratches and dirt on the printed face of the medium in the switchback device is suppressed, the finish print quality is improved. In addition, a reduction in size of the image forming apparatus can be intended.

BRIEF DESCRIPTION OF THE DRAWINGS

Other and further objects, features and advantages of the invention will appear more fully from the following description taken in connection with the accompanying drawings in which.

DETAILED DESCRIPTION OF THE PREFERRED EMBODIMENTS

Hereinafter, preferred embodiments of the present invention will be described with reference to FIGS. 1 to 5.

Figure 2:
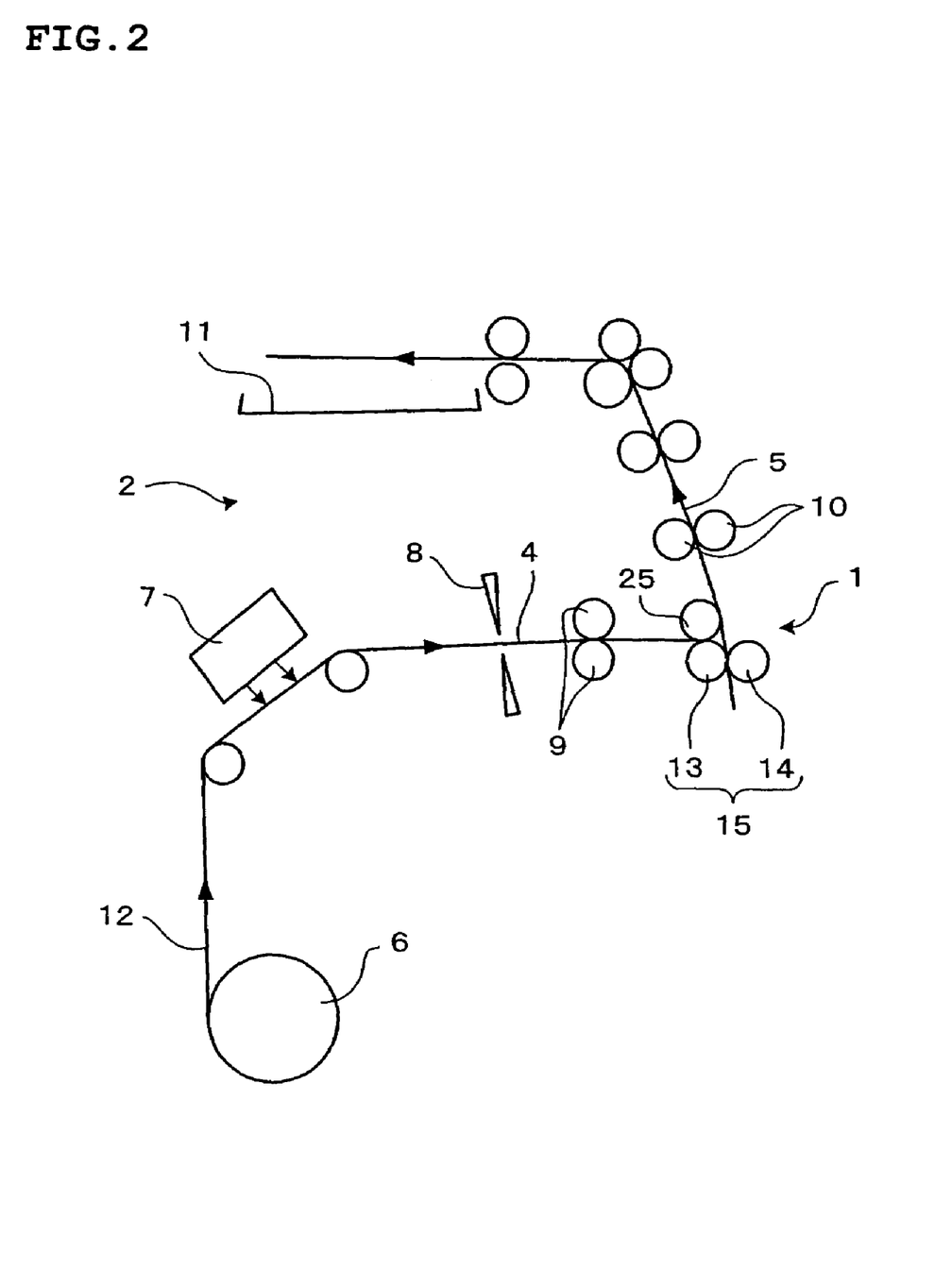
FIG. 2 is a side view of a medium conveyance path of an inkjet printer including the switchback device of the present invention.

FIG. 2 is a side view of a medium conveyance path 12 of an inkjet printer 2 including a switchback device 1 of the present invention. As shown in FIG. 2, the switchback device 1 is provided in the conveyance path 12 for a printed medium 3. The conveyance path 12 includes an upstream part 4, as a part of the conveyance path 12 upstream of a pair of upstream rollers 9 as will be described later, and a downstream part 5, as a part of the conveyance path 12 downstream of a pair of downstream rollers 10 as will be described later. The switchback device 1 reverses the direction of movement of the medium 3 sent from the upstream part 4 of the conveyance path 12, and then delivers the medium 3 to the downstream part 5 of the conveyance path 12. The conveyance path 12 of the inkjet printer 2 includes therein a paper roll 6 on which a continuum of media 3 for printing is rolled so that the faces of the media 3 to be printed face outward; a printing head 7 for printing on each medium 3; a cutter 8 for cutting the continuum of media 3 into each medium 3; a pair of upstream rollers 9 for sending each medium 3 into the switchback device 1; the switchback device 1; a pair of downstream rollers 10 for sending the medium 3 out of the switchback device 1; and a tray 11 for stocking discharged media 3. Media 3 forms a continuum upstream of the cutter 8.

Figure 1:
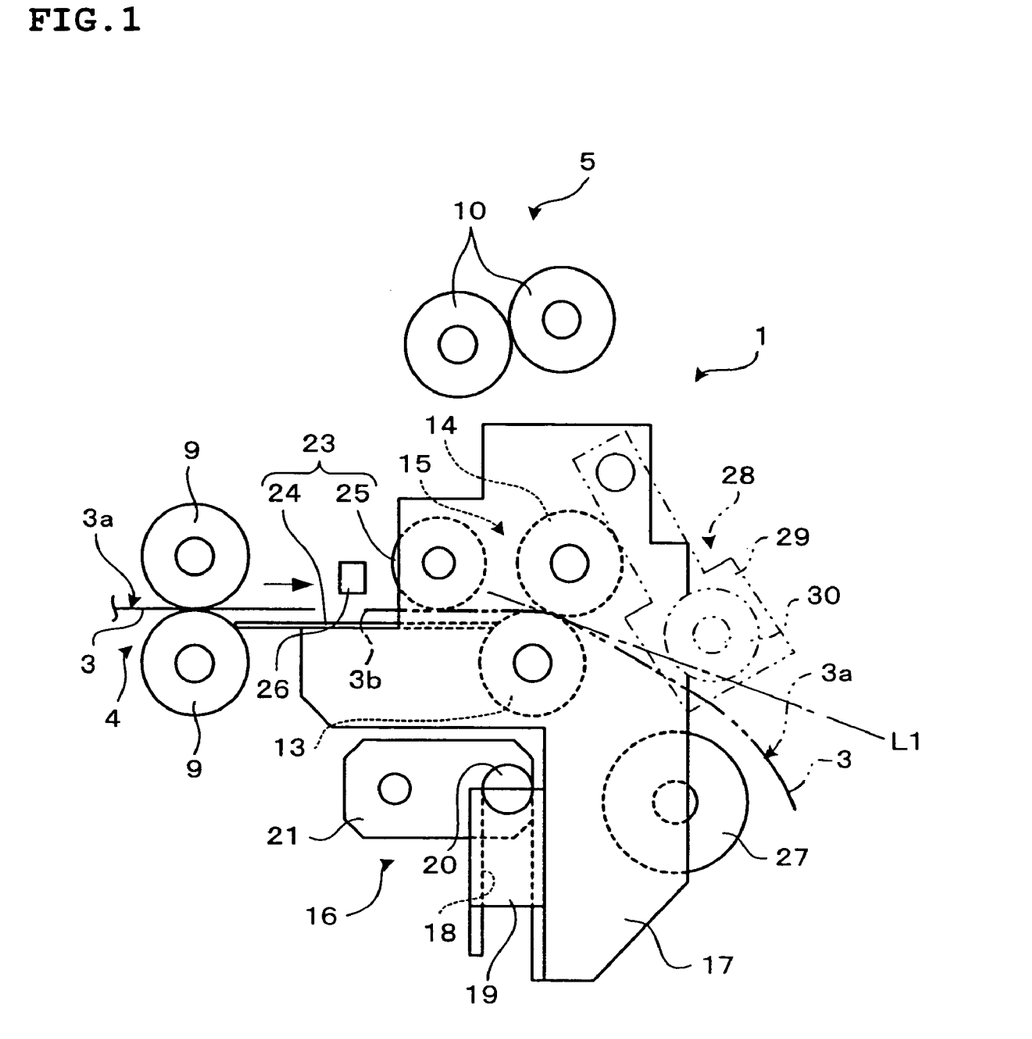
FIG. 1 is a side view of a switchback device of the present invention before operation.

FIG. 1 is a side view of the switchback device 1 of the present invention before operation. The switchback device 1 comprises: a pair of operation rollers 15 including a drive roller 13 for conveying a medium 3 and a slave roller 14 cooperating with the drive roller 13 to pinch the medium 3; a changeover mechanism 16 for changing the direction of the pair of operation rollers 15 including the drive roller 13 and the slave roller 14; and a receiving roller 27 used for relieving curl of the medium 3. In the switchback device 1, the medium 3 sent from the upstream part 4 of the conveyance path 12 is pinched by the drive roller 13 and the slave roller 14. In this state, the direction of the pair of operation rollers 15 including the drive roller 13 and the slave roller 14 is changed by the changeover mechanism 16, and then the drive roller 13 is reversed in rotation, to send the medium 3 to the downstream part 5 of the conveyance path 12.

The changeover mechanism 16 includes a supporting frame 17 for rotatably supporting the drive roller 13 and the slave roller 14; a slave member 19 fixed to the supporting frame 17 and having a cam groove 18; a cam 21 having a cam follower 20 being engaged with the cam groove 18; and a notshown rotation mechanism for rotating the cam 21 by an electric motor. The drive roller 13 is fixed at a predetermined position relative to the inkjet printer 2. Thus, the supporting frame 17 rotates around the drive roller 13. The slave roller 14 revolves around the drive roller 13. Attendant upon the revolution of the slave roller 14, the direction of the pair of operation rollers 15 is changed.

Figure 3:
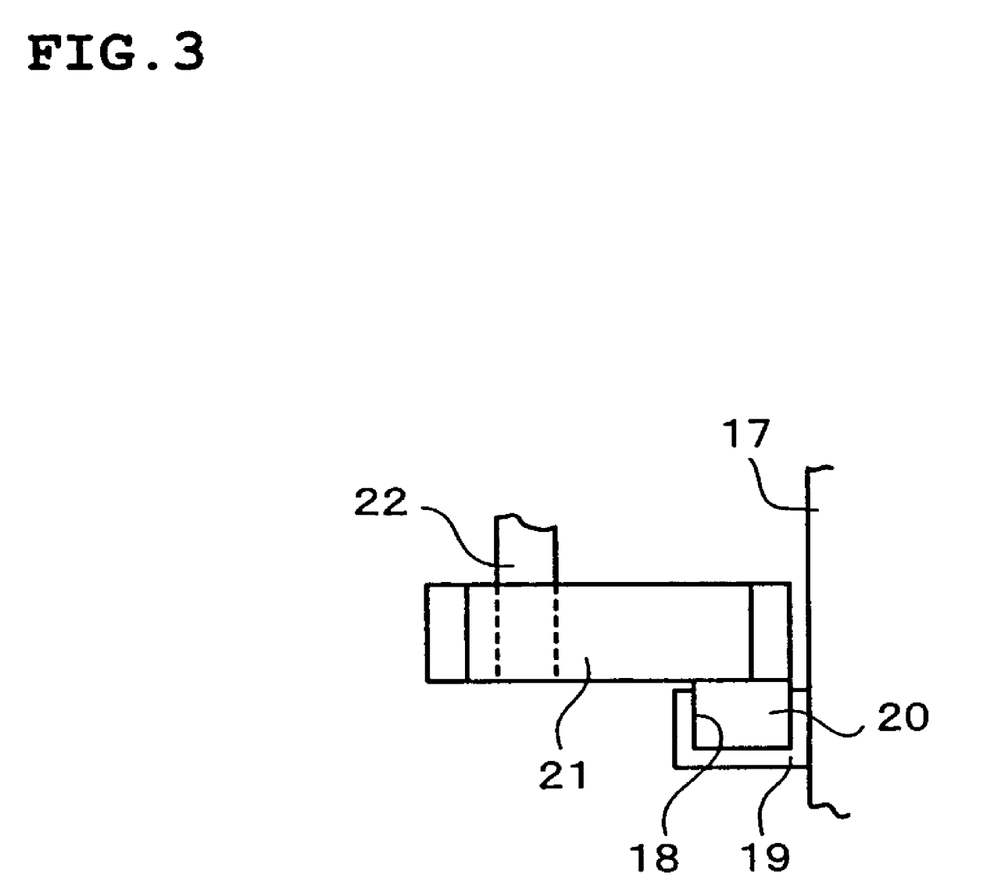
FIG. 3 is a plan view showing a relation between a cam and a slave member.
Figure 4:
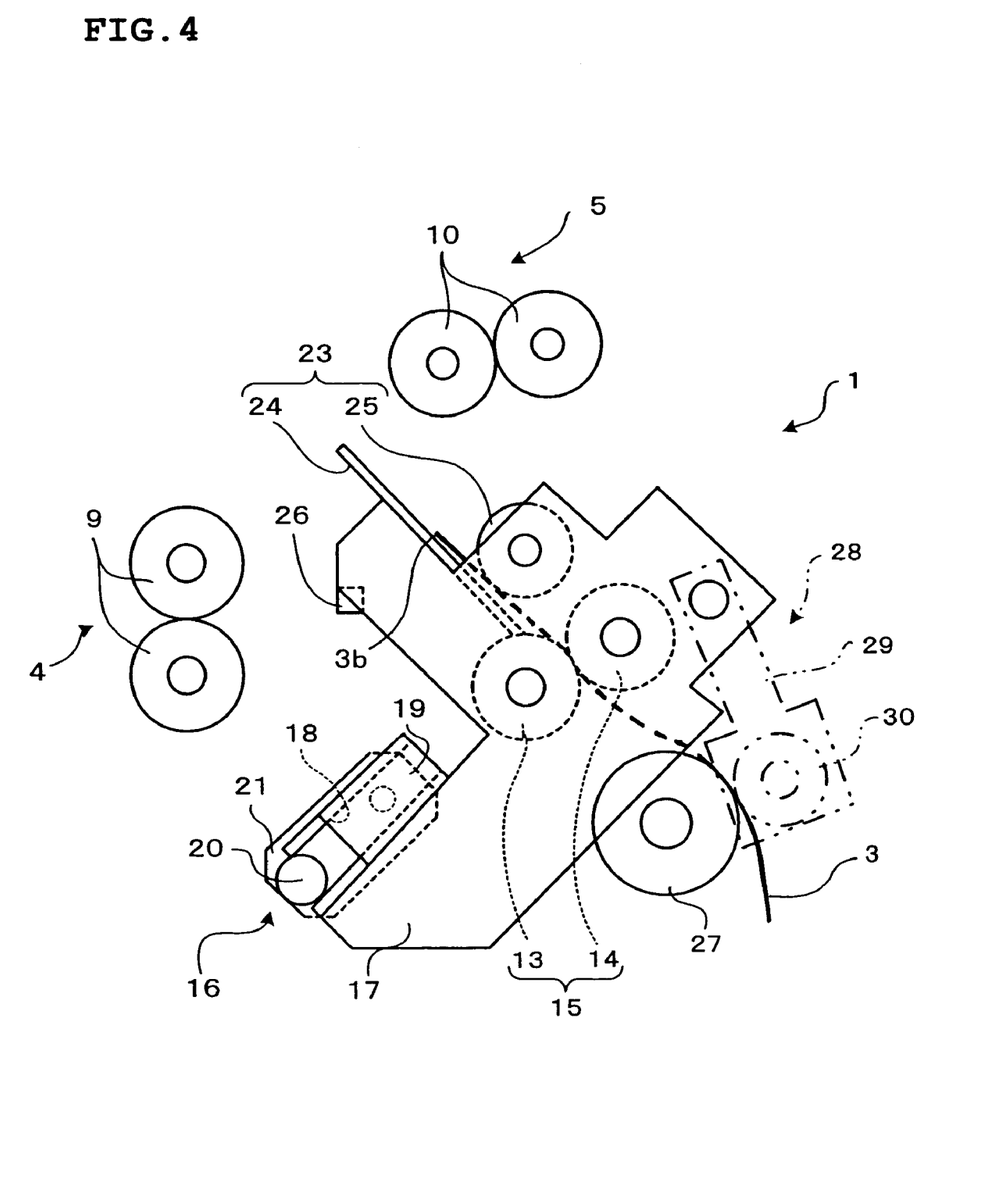
FIG. 4 is a side view showing a state wherein a supporting frame of the switchback device has somewhat rotated.
Figure 5:
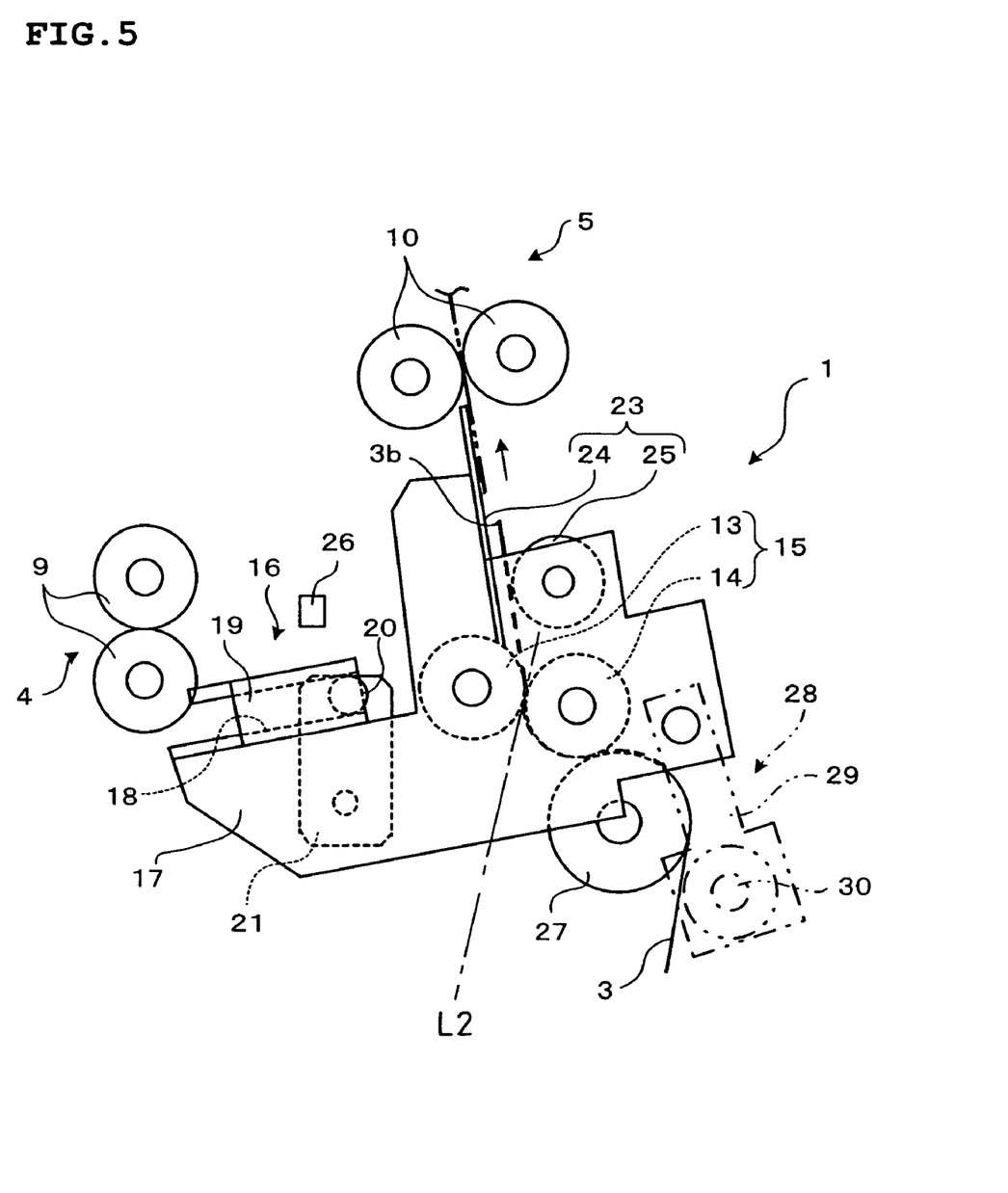
FIG. 5 is a side view showing a state wherein the supporting frame of the switchback device has completely rotated.

FIG. 3 is a plan view showing a relation between the cam 21 and the slave member 19. The slave member 19 is C-shaped in cross section and the cam groove 18 is formed inside the slave member 19. The cam 21 is rotatably supported by a shaft 22. When the cam 21 is rotated by an operation of the rotation mechanism, the cam follower 20 is guided in the cam groove 18 to rotate the supporting frame 17, as shown in FIGS. 1, 4, and 5.

The changeover mechanism 16 is provided with a guide member 23 for guiding the medium 3 between the pair of operation rollers 15 and the upstream part 4 of the conveyance path 12 and between the pair of operation rollers 15 and the downstream part 5 of the conveyance path 12. The guide member 23 can change the direction in which the medium 3 is guided, in accordance with the change of direction of the pair of operation rollers 15. The guide member 23 includes a guide plate 24 provided only on the back side of the medium 3; and a freely rotatable guide roller 25 provided on the printed face 3a side of the medium 3. The guide plate 24 does not rotate relative to the medium 3. A sensor 26 for detecting the medium 3 is provided between the pair of operation rollers 15 and the upstream part 4 of the conveyance path 12.

A receiving roller 27 is provided in the rear of the drive roller 13. The receiving roller 27 is rotatable around a shaft fixed to the body of the printer 2. Before the changeover mechanism 16 changes the direction of the pair of operation rollers 15, that is, before switchback, the receiving roller 27 is on the back side of the medium 3 relative to the common tangent L1 of the drive roller 13 and the slave roller 14, shown by an alternate long and short dash line in FIG. 1, that is, on the same side as the drive roller 13. Contrastingly, after the changeover mechanism 16 changes the direction of the pair of operation rollers 15, that is, after switchback, the receiving roller 27 is on the printed face side of the medium 3 relative to the common tangent L2 of the drive roller 13 and the slave roller 14, shown by an alternate long and short dash line in FIG. 5, that is, on the same side as the slave roller 14. In any case, the receiving roller 27 is disposed so as to be able to come into contact with the back face of the medium 3 that has passed the pair of operation rollers 15.

The changeover mechanism 16 is further provided with a pressing member 28 for pressing the medium 3 during a switchback operation. The pressing member 28 includes a frame 29 rotatably attached to the supporting frame 17; and a pressing roller 30 rotatably supported in the frame 29. The pressing member 28 presses, by its own weight, the medium 3 being pinched by the drive roller 13 and the slave roller 14, onto the receiving roller 27.

An operation of the above-described switchback device 1 will be described below.

A continuum of media 3 is drawn out from the paper roll 6 and printing is performed by the printing head 7. A printed medium 3 is cut off from the continuum of media 3 by the cutter 8. The cut-off medium 3 is sent by the pair of upstream rollers 9 into the switchback device 1, as shown by a solid line in FIG. 1. The medium 3 is guided by the guide plate 24 and the guide roller 25. At this time, the printed face 3a of the medium 3 is in contact only with the guide roller 25, which can rotate attendant upon the movement of the medium 3. Thus, generation of scratches and dirt on the printed face 3a can be suppressed.

Afterward, the medium 3 is pinched by the pair of operation rollers 15 including the drive roller 13 and the slave roller 14. In this state, the drive roller 13 is driven to take the medium 3 within the switchback device 1, as shown by an alternate long and two short dashes line in FIG. 1. When the sensor 26 detects the tail edge 3b of the medium 3, the drive roller 13 is stopped. Thus, a change of direction of the medium 3 can be performed even in a state wherein the entire medium 3 has not been taken in by the pair of operation rollers 15. This makes it possible to reduce the size of the space for taking the medium 3 in upon switchback, and thus a reduction in size of the switchback device 1 can be realized. Afterward, the rotation mechanism for the cam 21 is operated to rotate the cam 21. Thereby, the supporting frame 17 is rotated.

FIG. 4 is a side view showing a state wherein the supporting frame 17 has somewhat rotated. Attendant upon the rotation of the supporting frame 17, the slave roller 14 revolves around the drive roller 13 to change the direction of the pair of operation rollers 15. Attendant upon this, the direction of the medium 3 being pinched by the pair of operation rollers 15 is also changed. Further, the pressing member 28 moves down attendant upon the rotation of the supporting frame 17 so that the pressing roller 30 presses the medium 3 onto the receiving roller 27. This can prevent a case wherein the leading edge of the curved medium 3 rebounds and collides with another member and as a result, the medium 3 is bent or scratched and dirt is generated on the printed face 3a.

FIG. 5 is a side view showing a state wherein the supporting frame 17 has completely rotated. The tail edge 3b of the medium 3 faces the pair of downstream rollers 10. At this time, the slave roller 14 is pressed onto the receiving roller 27 to pinch the medium 3. Thus, the medium 3 having passed the pair of operation rollers 15 is wrapped on the slave roller 14 and pinched by the slave roller 14 and the receiving roller 27.

Afterward, the drive roller 13 is reversed in rotation so that medium 3 is conveyed in a state wherein its tail edge 3b has turned into the leading edge. At this time, the medium 3 is curved in reverse to curl. In this state, the medium 3 is conveyed with its printed face being pressed onto the slave roller 14. Thus, the medium 3 is decurled. Afterward, as shown by an alternate long and two short dashes line in FIG. 5, the medium 3 is sent to the pair of downstream rollers 10 in the downstream part 5 of the conveyance path 12. Thus, a switchback operation is completed. After the completion of the switchback operation, the rotation mechanism for the cam 21 operates in reverse to return the supporting frame 17 to its original position. The medium 3 is then discharged and stocked on the tray 11. Because the medium 3 was decurled in the switchback device 1, curl of the discharged medium 3 has been relieved.

Although a preferred embodiment of the present invention has been described, the present invention is not limited to the embodiment and various modifications, changes, and alternations can be made within the scope of the invention. For example, although the guide member 23 is constituted by the guide plate 24 and the guide roller 25 in the above-described embodiment, the present invention is not limited to that. The guide member 23 may be constituted by one of the guide plate 24 and the guide roller 25. For example, both faces of the medium 3 may be guided by guide rollers or guide plates. Further, no guide member may be used.

In the above-described embodiment, the drive roller 13 is fixed in a predetermined position and the slave roller 14 revolves around the drive roller 13. However, the present invention is not limited to that. In a modification, the slave roller 14 may be fixed at a predetermined position and the drive roller 13 may revolve around the slave roller 14. In another modification, both of the drive roller 13 and the slave roller 14 may be movable.

In the above-described embodiment, the changeover mechanism 16 is rotated by a cam mechanism. However, the present invention is not limited to that. For this purpose, another known rotation mechanism can be used, for example, the changeover mechanism 16 may be rotated by directly using the rotational force of an electric motor.

Figure 6:
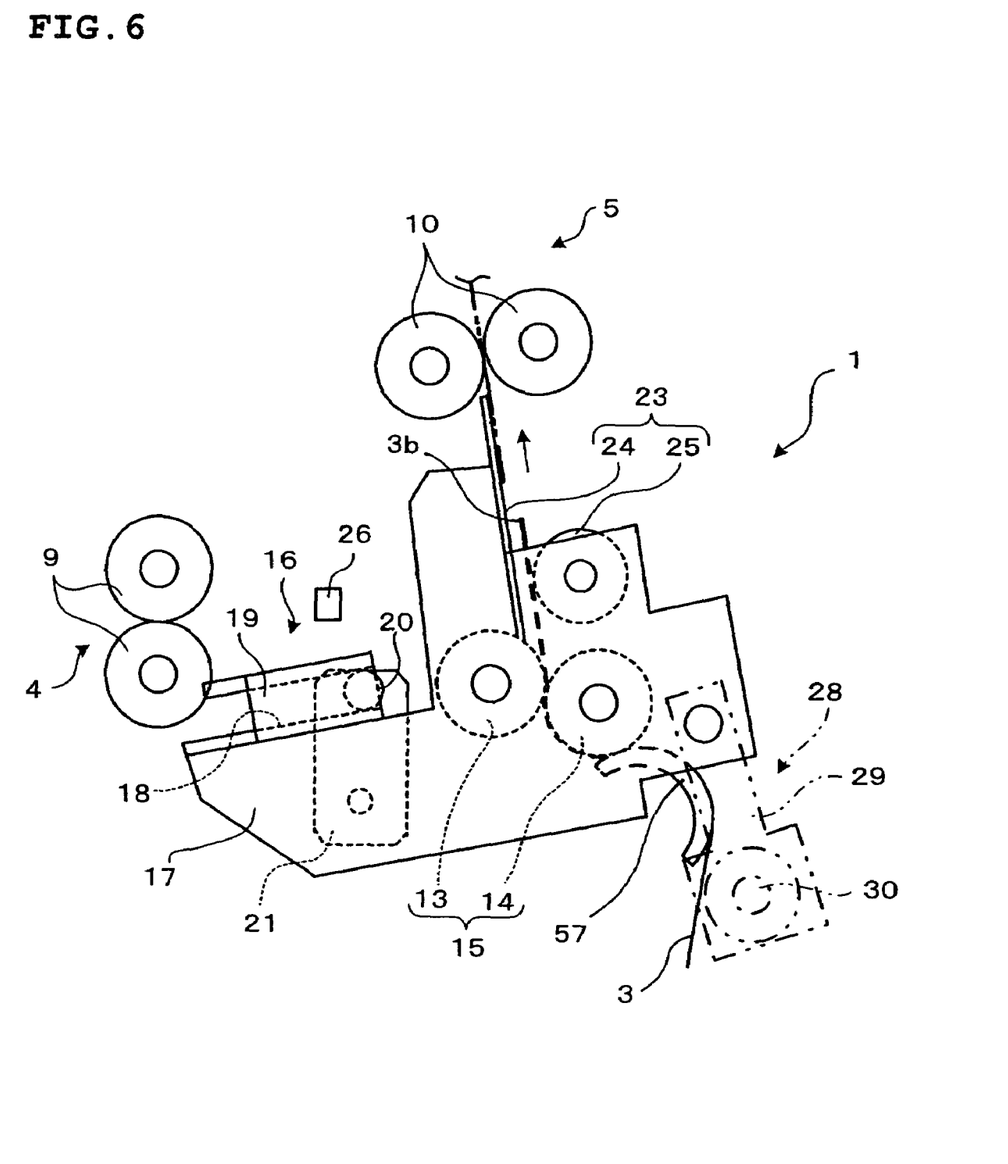
FIG. 6 is a side view showing an example of another contact member.

In the above-described embodiment, the receiving roller 27 is provided as a contact member for relieving curl of the medium 3 when the medium 3 having passed the pair of operation rollers 15 is being sent to the downstream part 5 of the conveyance path 12. In a modification, however, no such contact member may be used. Further, the contact member is not limited to the form of a roller. It may be a member in another form. For example, as shown in FIG. 6, the contact member may be in the form of a nearly U-shaped fixed receiving guide 57. Even in case that the contact member is in the form of a fixed receiving guide, the shape of the guide may be arbitrarily changed.

In the above-described embodiment, after the changeover mechanism 16 changes the direction of the pair of operation rollers 15, the medium 3 having passed the pair of operation rollers 15 is pinched by the slave roller 14 and the receiving roller 27. In a modification, however, the medium 3 may not be pinched by the slave roller 14 and the receiving roller 27. For example, the receiving roller 27 may be disposed at a distance from the slave roller 14 after the direction of the pair of operation rollers 15 is changed, as long as the back face of the medium 3 having passed the pair of operation rollers 15 can come into contact with the receiving roller 27. Even in case that the receiving roller 27 is at a distance from the slave roller 14, the distance between them is preferably as small as possible.

In the above-described embodiment, the pressing member 28 presses the medium 3, which has passed the pair of operation rollers 15, onto the receiving roller 27. In a modification, however, no such pressing member is used.

In the above-described embodiment, the switchback device 1 is used in the inkjet printer 2. However, the present invention is not limited to that. A switchback device of the present invention may be used in an image forming apparatus of another type, for example, a photo printing/developing machine.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A switchback device provided in a conveyance path for a printed medium, for reversing the direction of movement of the medium sent from an upstream part of the conveyance path and then delivering the medium to a downstream part of the conveyance path, the switchback device comprising:
  a pair of rollers including a drive roller that conveys the medium and a slave roller that cooperates with the drive roller to pinch the medium; and
  a changeover mechanism that changes a position of a center of at least one of the pair of rollers which is pinching the medium sent from the upstream part of the conveyance path, and the direction of rotation of the pair of rollers pinching the medium therebetween is reversed after the changeover mechanism changes the position of the center of at least one of the pair of rollers.

2. The switchback device according to claim 1, wherein the drive roller is fixed in a predetermined position, the slave roller revolves around the drive roller, and the changeover mechanism revolves the slave roller to change the position of the center of the slave roller.

3. The switchback device according to claim 1, further comprising a guide member that is disposed in the vicinity of the pair of rollers and guides the medium, the guide member being able to change the direction in which the medium is guided, in accordance with the change of position of the center of at least one of the pair of rollers.

4. The switchback device according to claim 2, further comprising a guide member that is disposed in the vicinity of the pair of rollers and guides the medium, the guide member being able to change the direction in which the medium is guided, in accordance with the change of position of the center of the slave roller.

5. The switchback device according to claim 3, wherein the guide member includes a fixing member which does not rotate relative to the medium, the fixing member being provided on a back side of the medium.

6. The switchback device according to claim 4, wherein the guide member includes a fixing member which does not rotate relative to the medium, the fixing member being provided on a back side of the medium.

7. The switchback device according to claim 3, wherein the guide member is a freely rotatable guide roller.

8. The switchback device according to claim 4, wherein the guide member is a freely, rotatable guide roller.

9. The switchback device according to claim 1, further comprising a contact member provided on a back side of the medium, which is sent from the upstream part of the conveyance path and pinched by the drive roller and the slave roller, the contact member coming into contact with the back side of the medium when the changeover mechanism changes the position of the center of at least one of the pair of rollers.

10. The switchback device according to claim 2, further comprising a contact member provided on a back side of the medium, which is sent from the upstream part of the conveyance path and pinched by the drive roller and the slave roller, the contact member coming into contact with the back side of the medium when the changeover mechanism changes the position of the center of the slave roller.

11. The switchback device according to claim 9, wherein the contact member is a freely rotatable roller.

12. The switchback device according to claim 10, wherein the contact member is a freely rotatable roller.

13. The switchback device according to claim 9, wherein, after the changeover mechanism changes the position of the center of at least one of the pair of rollers, the medium having passed between the drive roller and the slave roller is pinched by the contact member and either of the drive roller and the slave roller which is located on a record face of the medium relative to a common tangent of the drive roller and the slave roller.

14. The switchback device according to claim 10, wherein, after the changeover mechanism changes the position of the center of the slave roller, the medium having passed between the drive roller and the slave roller is pinched by the contact member and either of the drive roller and the slave roller which is located on a record face side of the medium relative to a common tangent of the drive roller and the slave roller.

15. The switchback device according to claim 9, further comprising a pressing member that, after the changeover mechanism changes the position of the center of at least one of the pair of rollers, presses the medium onto the contact member while being in contact with a record face of the medium having passed between the drive roller and the slave roller.

16. The switchback device according to claim 10, further comprising a pressing member that, after the changeover mechanism changes the position of the center of the slave roller, presses the medium onto the contact member while being in contact with a record face of the medium having passed between the drive roller and the slave roller.

17. An image forming apparatus comprising a switchback device provided in a conveyance path for a printed medium, for reversing the direction of movement of the medium sent from an upstream part of the conveyance path and then delivering the medium to a downstream part of the conveyance path, the switchback device comprising:
    a pair of rollers including a drive roller that conveys the medium and a slave roller that cooperates with the drive roller to pinch the medium; and
    a changeover mechanism that changes a position of a center of at least one of the pair of rollers which is pinching the medium sent from the upstream part of the conveyance path, and the direction of rotation of the pair of rollers pinching the medium therebetween is reversed after the changeover mechanism changes the position of the center of at least one of the pair of rollers.

* * * * *